United States Patent
Zheng et al.

(10) Patent No.: US 8,534,652 B2
(45) Date of Patent: Sep. 17, 2013

(54) POSITIONING MACHINE

(75) Inventors: Zhang-Yong Zheng, Shenzhen (CN);
Ju-Yuan Zhang, Shenzhen (CN); Xin Lu, Shenzhen (CN); Shih-Fang Wong, Tu-Cheng (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 228 days.

(21) Appl. No.: 13/097,093

(22) Filed: Apr. 29, 2011

(65) Prior Publication Data
US 2012/0168999 A1 Jul. 5, 2012

(51) Int. Cl.
*B23Q 3/18* (2006.01)

(52) U.S. Cl.
USPC ............... 269/60; 269/71; 269/309

(58) Field of Classification Search
USPC ............ 269/289 R, 291, 55, 60, 71; 33/1 M; 451/392, 393, 411
See application file for complete search history.

(56) References Cited

U.S. PATENT DOCUMENTS

| | | | | | |
|---|---|---|---|---|---|
| 2,981,123 | A | * | 4/1961 | McHugh | 74/665 E |
| 3,124,018 | A | * | 3/1964 | Gough | 269/60 |
| 3,749,501 | A | * | 7/1973 | Wieg | 356/619 |
| 4,155,173 | A | * | 5/1979 | Sprandel | 33/503 |
| 4,409,860 | A | * | 10/1983 | Moriyama et al. | 74/490.09 |
| 4,631,834 | A | * | 12/1986 | Hayashi et al. | 33/503 |
| 4,667,139 | A | * | 5/1987 | Hirai et al. | 318/687 |
| 4,678,976 | A | * | 7/1987 | Inoue | 318/577 |
| 4,713,887 | A | * | 12/1987 | Kitamura | 33/1 M |
| 4,896,869 | A | * | 1/1990 | Takekoshi | 269/60 |
| 5,031,331 | A | * | 7/1991 | Herzog et al. | 33/503 |
| 5,173,016 | A | * | 12/1992 | Ellison et al. | 409/132 |
| 5,292,211 | A | * | 3/1994 | Takei | 408/91 |
| 5,323,712 | A | * | 6/1994 | Kikuiri | 108/20 |
| 5,613,403 | A | * | 3/1997 | Takei | 74/490.09 |
| 5,724,893 | A | * | 3/1998 | Lee et al. | 108/20 |
| 5,895,311 | A | * | 4/1999 | Shiotani et al. | 451/5 |
| 5,921,533 | A | * | 7/1999 | Miyamoto et al. | 269/71 |
| 6,240,796 | B1 | * | 6/2001 | Yamada | 74/89.23 |
| 6,244,192 | B1 | * | 6/2001 | Suzuki et al. | 108/20 |
| 6,848,327 | B2 | * | 2/2005 | Nagai et al. | 74/89.33 |
| 7,259,872 | B2 | * | 8/2007 | Mullikin | 356/622 |
| 7,823,516 | B2 | * | 11/2010 | Yamazaki et al. | 108/20 |
| 2003/0167977 | A1 | * | 9/2003 | Katayama | 108/20 |
| 2008/0196631 | A1 | * | 8/2008 | Kosmowski et al. | 108/20 |

FOREIGN PATENT DOCUMENTS

JP    02116442 A  *  5/1990

* cited by examiner

*Primary Examiner* — Lee D Wilson
*Assistant Examiner* — Tyrone V Hall, Jr.
(74) *Attorney, Agent, or Firm* — Altis Law Group, Inc.

(57) ABSTRACT

A positioning machine includes a base, a support portion mounted on the base for supporting a workpiece and a first positioning mechanism received in the recessed portion. The base defines a recessed portion. Two sidewalls of the recessed portion respectively define a pair of first tracks. The first positioning mechanism includes a first motor, a first coupler, a first positioning block, a first screw rod, and a first nut movably mounted over the first screw rod and fixed to a low surface of the support portion. The first coupler is forced by the first motor to drive the first screw rod to rotate to drive the first nut to move along the first screw rod, causing the support portion to be moved along the first tracks, and the workpiece to be moved in a predetermined position relative to the base.

4 Claims, 4 Drawing Sheets

POSITIONING MACHINE

BACKGROUND

1. Technical Field

The present disclosure relates to positioning machines and, particularly, to a positioning machine to position a workpiece.

2. Description of Related Art

In general, workpieces are often manually positioned first, and then are machined. Such a method of positioning the workpieces is prone to error, and can result in low precision.

Therefore, what is needed is a positioning machine to overcome the described limitations.

DETAILED DESCRIPTION

Figure 1:
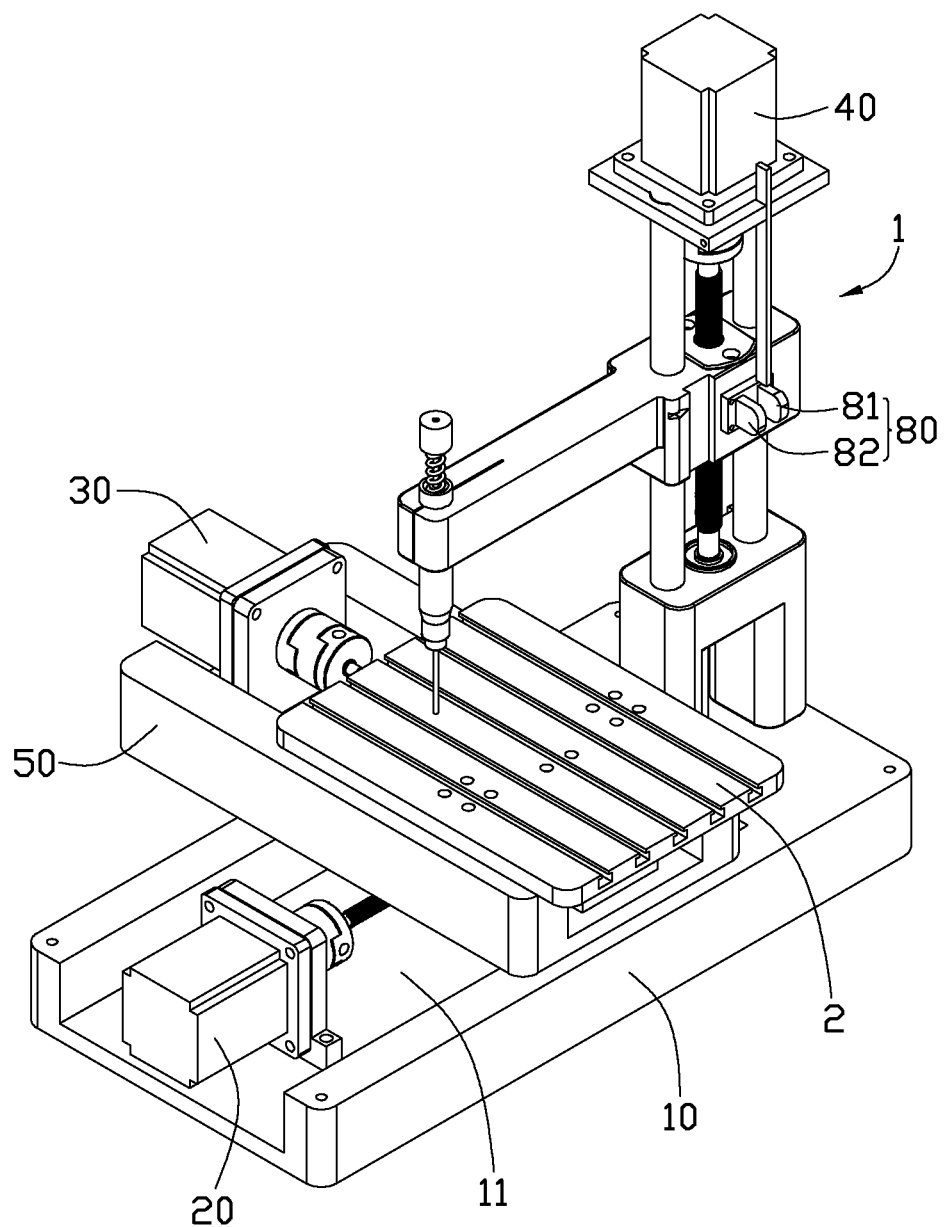
FIG. 1 is an isometric view of a positioning machine in accordance with an exemplary embodiment.
Figure 2:
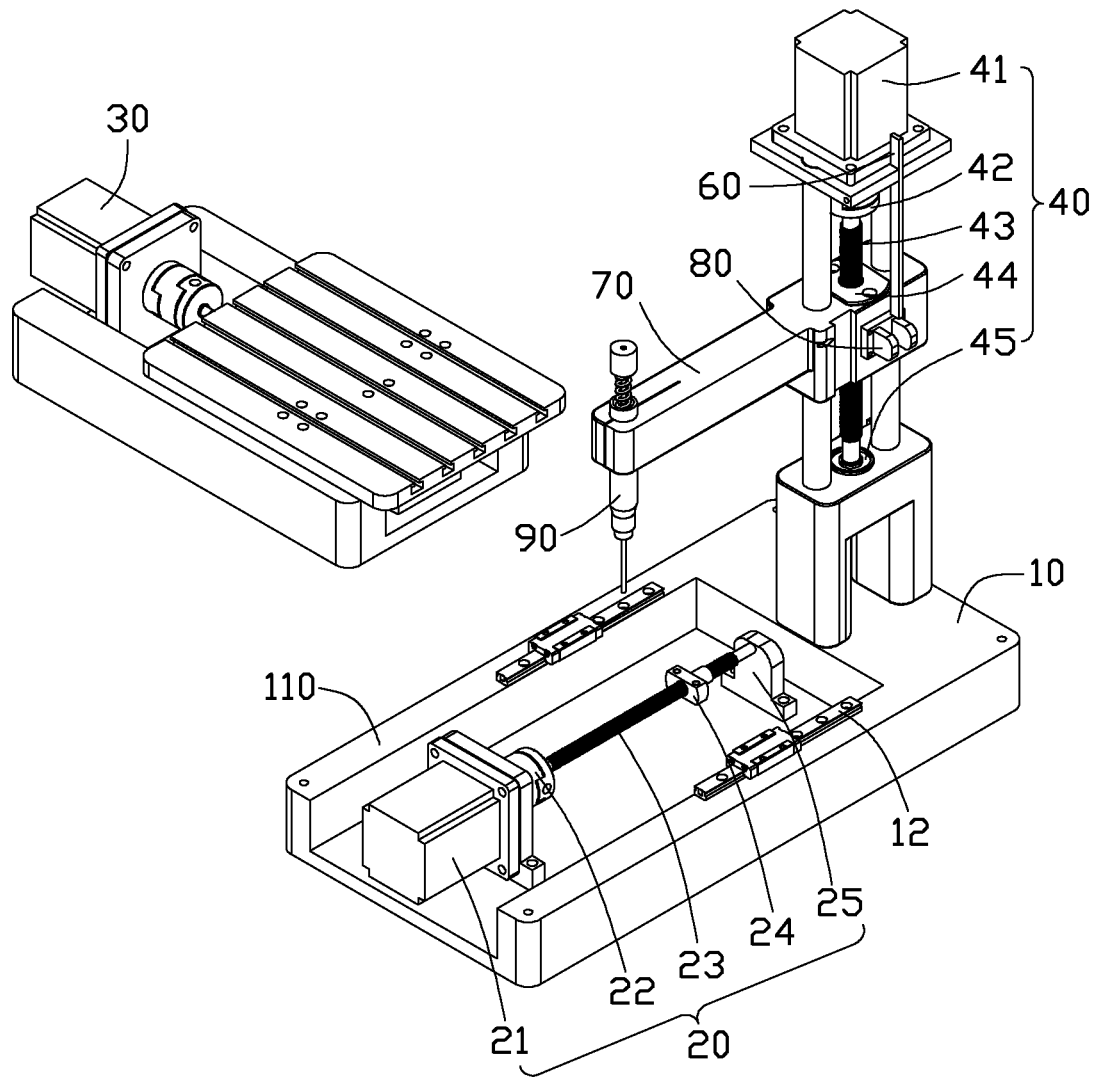
FIG. 2 is an exploded view of the positioning machine of FIG. 1.

Referring to FIGS. 1-2, an embodiment of a positioning machine 1 is illustrated. The positioning machine 1 includes a base 10, a support portion 50 mounted on the base 10, and a first positioning mechanism 20. The base 10 defines a recessed portion 11. Two opposite sidewalls 110 of the recessed portion 11 respectively define a pair of first tracks 12. The support portion 50 is configured for supporting a workpiece 2 to be positioned. The first positioning mechanism 20 is received in the recessed portion 11. The first positioning mechanism 20 includes a first motor 21, a first coupler 22, a first positioning block 25, a first screw rod 23 fixed between the first coupler 22 and the first positioning block 25, and a first nut 24 movably mounted over the first screw rod 23. The first nut 24 is fixed to a low surface of the support portion 50.

To adjust the workpiece 2 in a first orientation, the first coupler 22 is forced by the first motor 21 to drive the first screw rod 23 to rotate, causing the first nut 24 to be moved along the first screw rod 23. Because the first nut 24 is fixed to the low surface of the support portion 50, the support portion 50 is driven by the first nut 24 to move along the first track 12, thereby causing the workpiece 2 received on the support portion 50 to be moved to a desired position. In order to better understand the disclosure, an exemplary embodiment is described in detail.

Figure 3:
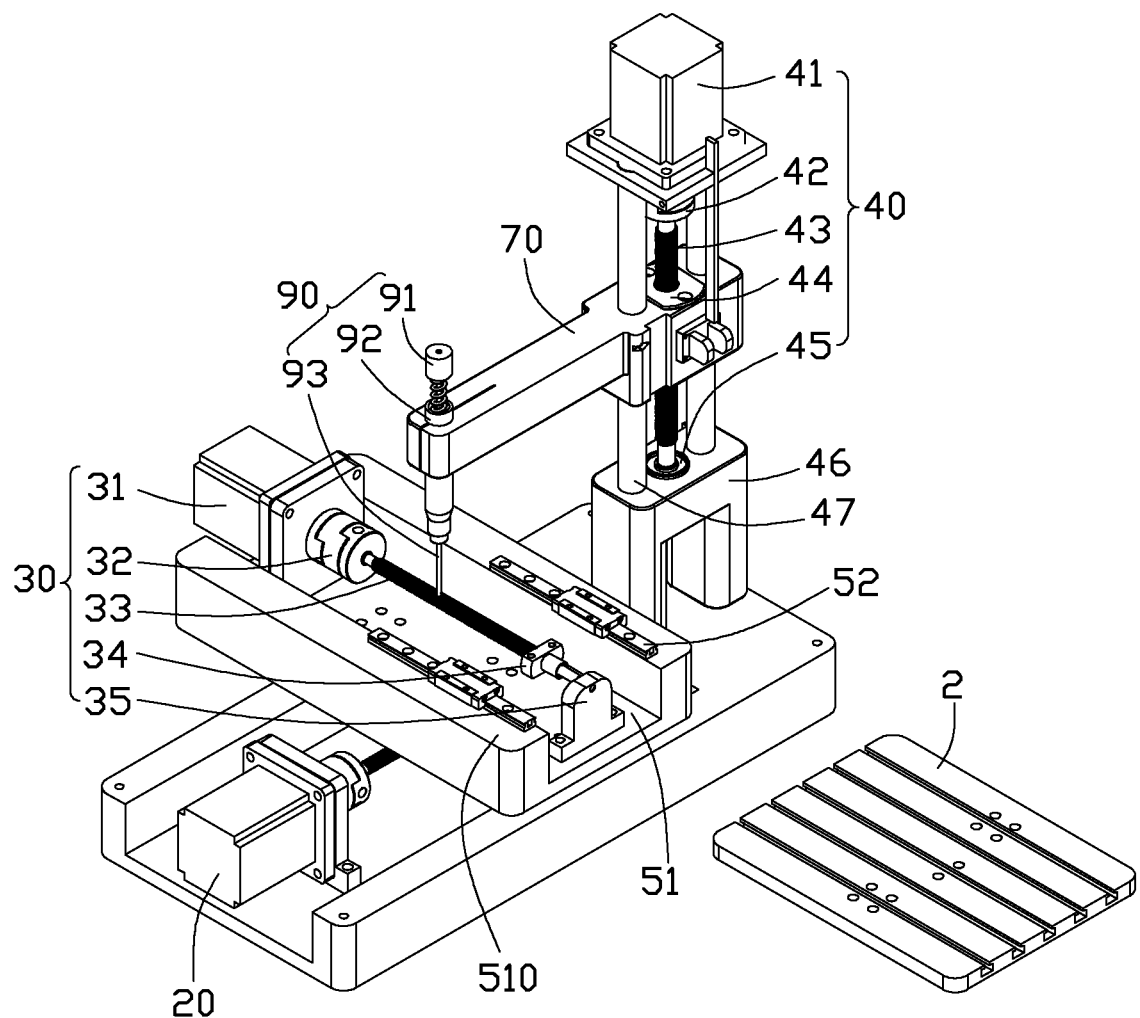
FIG. 3 is another exploded view of the positioning machine of FIG. 1.

Referring to FIG. 3, the support portion 50 defines a groove 51 with two opposite openings at lengthwise ends thereof. Two opposite sidewalls 510 of the groove 51 respectively define a pair of second tracks 52.

The positioning machine 1 further includes a second positioning mechanism 30 received in the groove 51. The second positioning mechanism 30 includes a second motor 31, a second coupler 32, a second positioning block 35, a second screw rod 33 fixed between the second coupler 32 and the second positioning block 35, and a second nut 34 movably mounted over the second screw rod 33. The second nut 34 is kept in contact with a low surface of the workpiece 2.

When attempting to adjust the workpiece 2 in a second orientation, the second coupler 32 is forced by the second motor 31 to drive the second screw rod 33 to rotate, causing the second nut 34 to move along the second screw rod 33. Because the second nut 34 is kept in contact with the low surface of the workpiece 2, the workpiece 2 is driven by the second nut 34 to move in a desired position along the second track 52 in the second orientation.

The positioning machine 1 further includes a third positioning mechanism 40 fixed on the base 10. The third positioning mechanism 40 includes a third motor 41, a third coupler 42, a third positioning block 45, a third screw rod 43 fixed between the third coupler 42 and the third positioning block 45, and a third nut 44 movably mounted over the third screw rod 43. The positioning machine 1 further includes a light barrier 60 movably connected to the third motor 41, a moving portion 70 mounted over the third nut 44, a photoelectric switch 80 fixed on the moving portion 70 and below the light barrier 60, and a probe needle 90 perpendicularly mounted on one end of the moving portion 70 away from the photoelectric switch 80. The light barrier 60 is movable to block the light beam within the photoelectric switch 80. The photoelectric switch 80 includes a sender 81 and a receiver 82. The sender 81 emits light. The receiver 82 receives the light. The photoelectric switch 80 generates a high level signal when the receiver 82 receives the light, and generates a low level signal when the receiver 82 does not receive the light.

Figure 4:
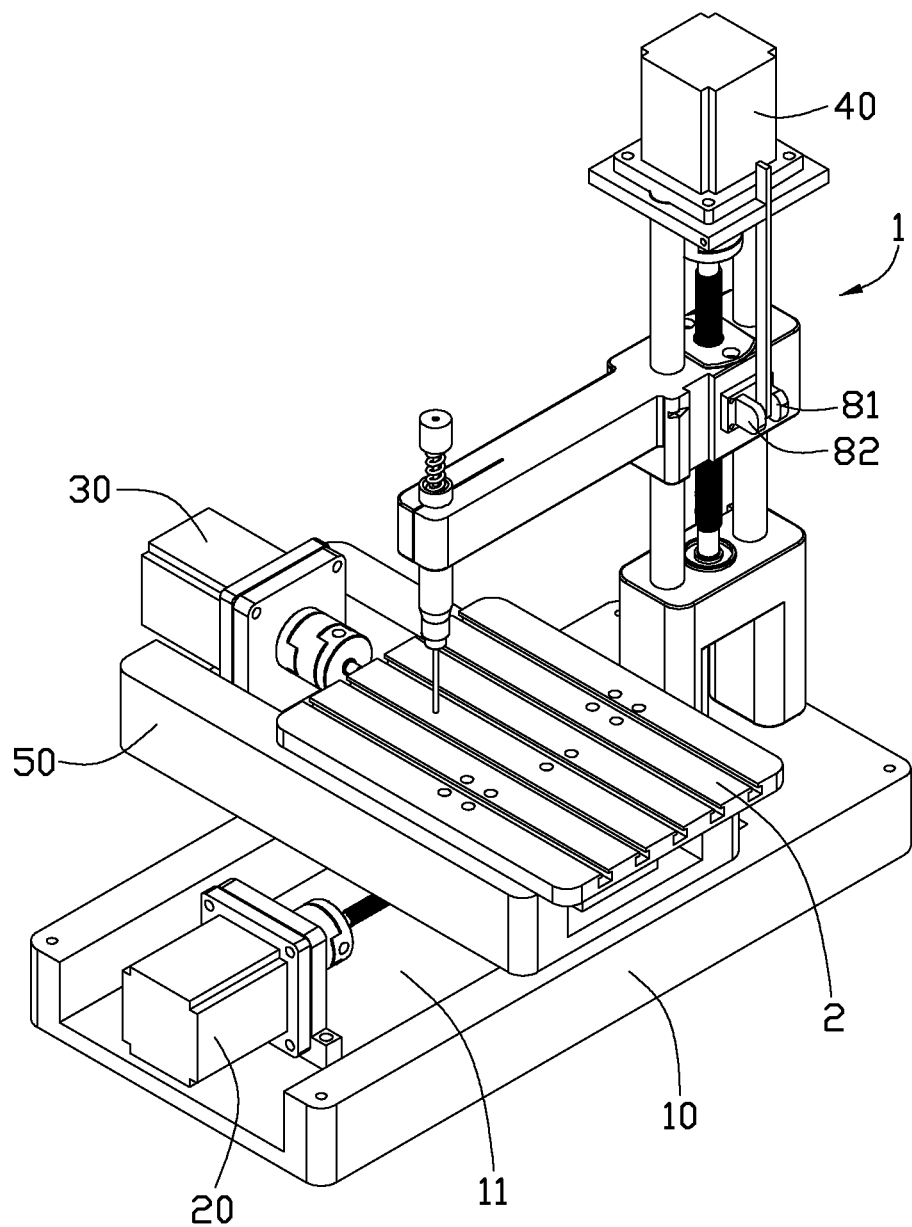
FIG. 4 shows the positioning machine of FIG. 1 in a working state.

Referring to FIG. 4, when attempting to machine the workpiece 2 after the workpiece 2 is respectively adjusted in the first orientation and the second orientation, the third coupler 42 is forced by the third motor 41 to drive the third screw rod 43 to rotate, causing the third nut 44 to move along the third screw rod 43. Because the moving portion 70 is mounted over the third nut 44 and the photoelectric switch 80 is fixed on the moving portion 70, the moving portion 70 and the photoelectric switch 80 are driven by the third nut 44 to move along the third screw rod 43. During movement of the photoelectric switch 80, the photoelectric switch 80 generates a high level signal to the third motor 41 if the receiver 82 receives the light from the sender 81. The third motor 41 drives the moving portion 70 to continually move towards the workpiece 2 according to the high level signal until the probe needle 90 presses the workpiece 2. When the workpiece 2 is pressed by the probe needle 90 in a predetermined pressure, the light barrier 60 is adjusted by the user to block the light from receiving by the receiver 82, causing the photoelectric switch 80 to generate a low level signal to the third motor 41. The third motor 41 stops working according to the low level signal, causing the third nut 44 to be fixed in a predetermined position within the third screw rod 43, and the workpiece 2 to be pressed by the probe needle 90 in the predetermined pressure. After the workpiece 2 is pressed in the predetermined pressure, the user can commence work on the workpiece 2.

The third positioning mechanism 40 further includes a fixing portion 46 fixed on the base 10 and two opposite third tracks 47 fixed between the third motor 41 and the fixing portion 46. The two opposite third tracks 47 pass through the moving portion 70 and are parallel to the third screw rod 43. The moving portion 70 is driven by the third nut 44 to move along the third tracks 47.

The probe needle 90 includes a touching portion 93, a probe portion 91, and an elastic element 92 connecting the touching portion 93 to the probe portion 91. The elastic element 92 is deformed when the touching portion 93 presses the workpiece 2. The probe portion 91 is configured for determining the pressure on the workpiece 2 according to the deformation of the elastic element 92. In one embodiment, the elastic element 92 is a spring.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A positioning machine for positioning a workpiece, comprising:
 a base defining a recessed portion on its top surface, two opposite sidewalls of the recessed portion respectively defining a pair of first tracks;
 a support portion mounted on the base for supporting the workpiece, defining a groove with two opposite opening at lengthwise ends thereof, wherein two sidewalls of the groove respectively define a pair of second tracks; and
 a first positioning mechanism received in the recessed portion, comprising:
  a first motor;
  a first coupler;
  a first positioning block;
  a first screw rod fixed between the first coupler and the first positioning block; and
  a first nut movably mounted over the first screw rod and fixed to a low surface of the support portion, wherein the first coupler is forced by the first motor to drive the first screw rod to rotate, the first nut is driven by the first screw rod to move along the first screw rod, and the support portion is driven by the first nut to move along the first tracks, thereby driving the workpiece to be moved in a predetermined position relative to the base;
 a second positioning mechanism received in the groove, comprising:
  a second motor;
  a second coupler;
  a second positioning block;
  a second screw rod fixed between the second coupler and the second positioning block; and
  a second nut movably mounted over the second screw rod, and kept in contact with a low surface of the workpiece, wherein the second coupler is forced by the second motor to drive the second screw rod to rotate, the second nut is driven by the second screw rod to move along the second screw rod, thereby causing the workpiece to be move along the second tracks;
 a third positioning mechanism fixed on the base, comprising:
  a third motor;
  a third coupler;
  a third positioning block;
  a third screw rod fixed between the third coupler and the third positioning block; and
  a third nut movably mounted over the third screw rod;
 a light barrier movably connected to the third motor;
 a moving portion mounted over the third nut;
 a photoelectric switch fixed on the moving portion and below the light barrier; and
 a probe needle perpendicularly mounted on one end of the moving portion away from the photoelectric switch;
 wherein the third coupler is forced by the third motor to drive the third screw rod to rotate, the third nut is driven by the third screw rod to move along the third screw rod, the moving portion and the photoelectric switch are driven by the third nut to move along the third screw rod, during movement of the photoelectric switch, the photoelectric switch generates a high level signal to the third motor when light from the photoelectric switch is not blocked by the light barrier, the third motor drives the moving portion to continually move towards the workpiece according to the high level signal until the workpiece is pressed by the probe needle in a predetermined pressure, then, the light barrier is adjusted until the light from the photoelectric switch is not blocked by the light barrier, the photoelectric switch generates a low level signal to the third motor, the third motor stops to work according to the low level signal, thereby causing the third nut to be fixed in a predetermined position within the third screw rod, and the workpiece to be pressed by the probe needle in the predetermined pressure.

2. The positioning machine as described in claim 1, wherein the probe needle comprises a touching portion, a probe portion and an elastic element connecting the touching portion to the probe portion, the elastic element is deformed when the touching portion presses the workpiece, and the probe portion is configured for determining the pressure on the workpiece according to the deformation of the elastic element.

3. The positioning machine as described in claim 2, wherein the elastic element is a spring.

4. The positioning machine as described in claim 1, wherein the third positioning mechanism further comprises a fixing portion fixed on the base and two opposite third tracks fixed between the third motor and the fixing portion, the two third tracks pass through the moving portion and are parallel to the third screw rod, the moving portion is driven by the third nut to move along the third tracks.

* * * * *